Nov. 9, 1943.  J. B. DAVENPORT  2,334,075
PHOTOGRAPHIC APPARATUS
Filed March 27, 1942   2 Sheets-Sheet 1
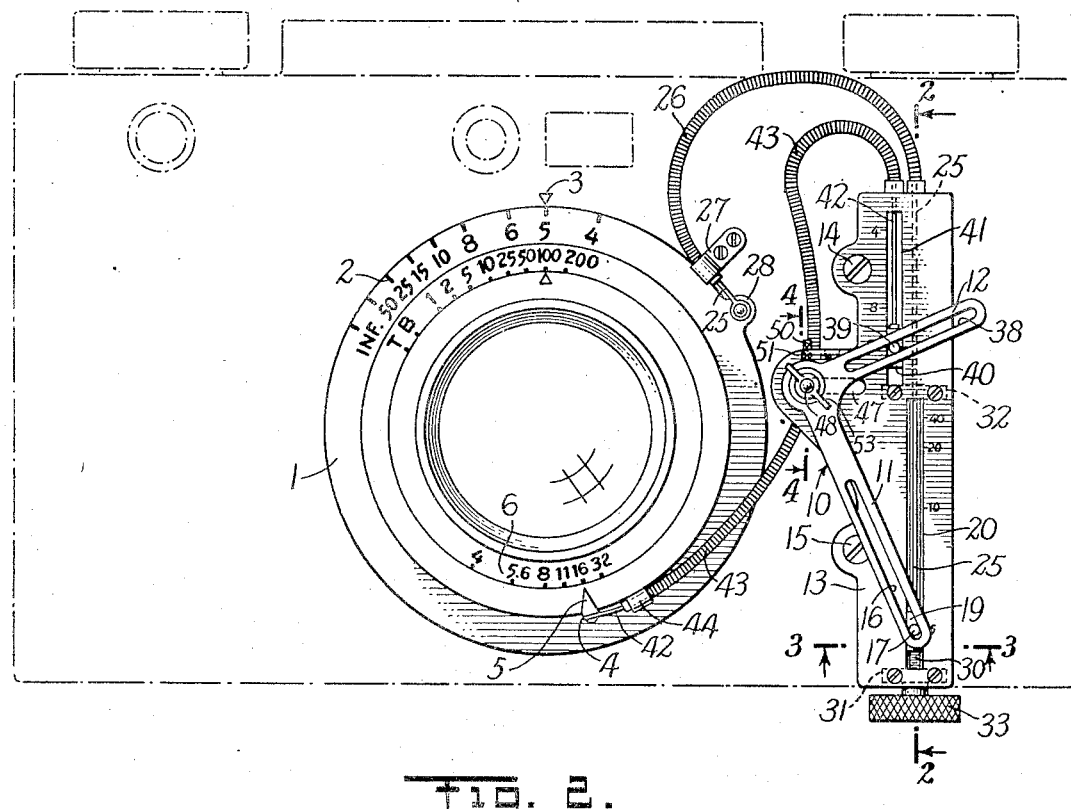
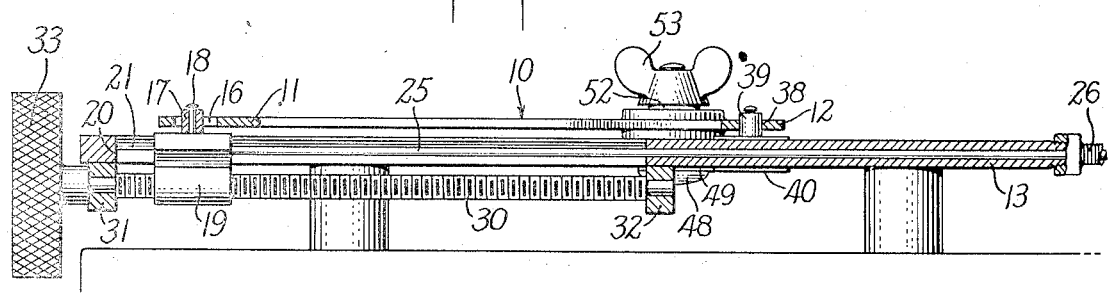
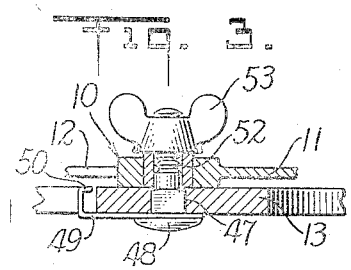
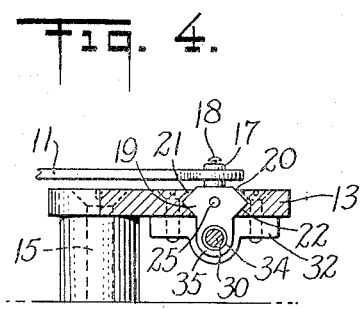
INVENTOR
John B. Davenport
BY
Blair, Curtis & Hayward
ATTORNEYS Nov. 9, 1943.   J. B. DAVENPORT   2,334,075
PHOTOGRAPHIC APPARATUS
Filed March 27, 1942    2 Sheets-Sheet 2
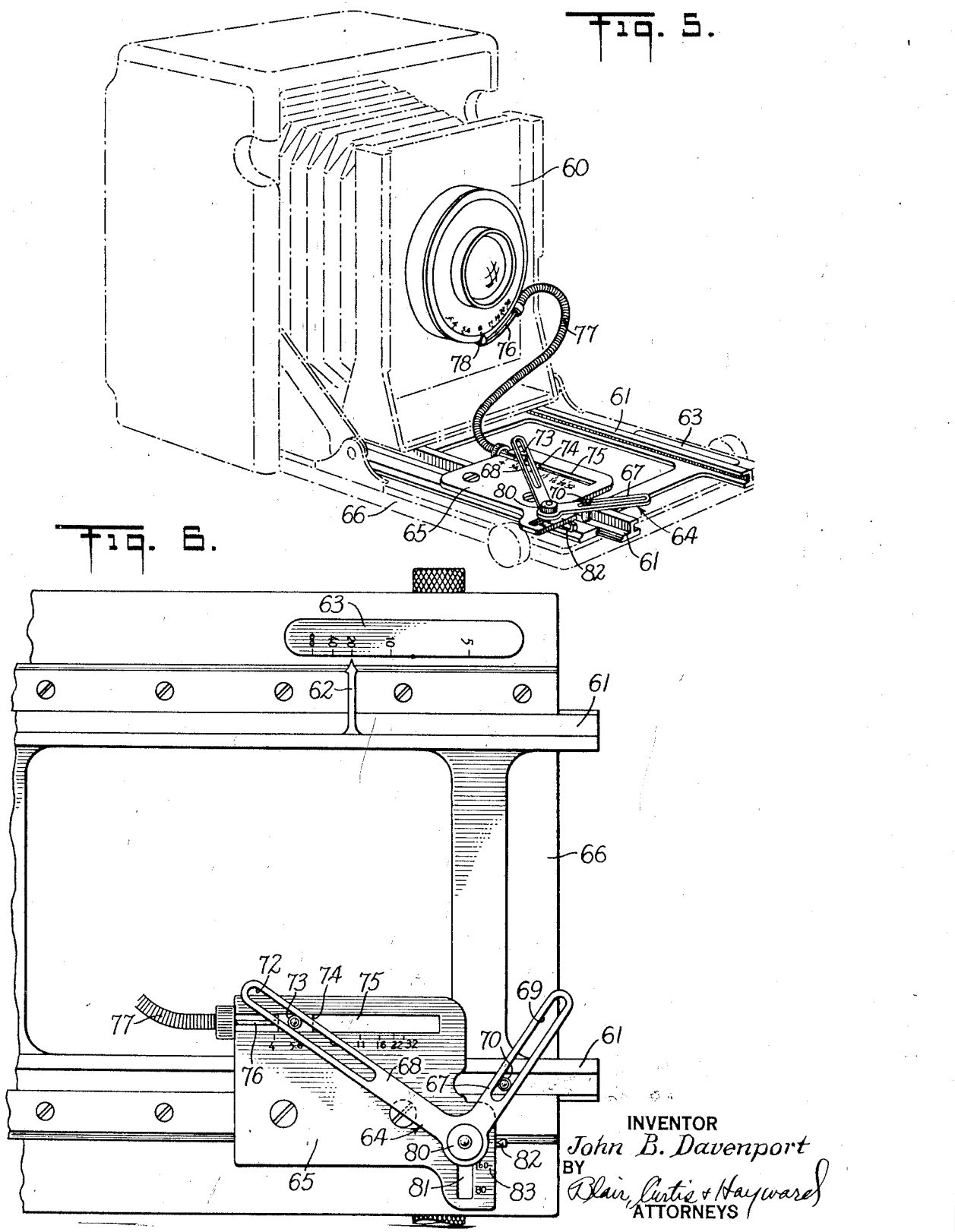
INVENTOR
John B. Davenport
BY
Blair, Curtis & Hayward
ATTORNEYS Patented Nov. 9, 1943

2,334,075

UNITED STATES PATENT OFFICE 2,334,075

PHOTOGRAPHIC APPARATUS

John B. Davenport, Provincetown, Mass.

Application March 27, 1942, Serial No. 436,418

11 Claims. (Cl. 95—64)

This invention relates to photographic apparatus and more particularly to apparatus for automatically maintaining a predetermined relation between the lens aperture of a camera and the focal position of the lens, that is, the position of the lens when it is properly focused for a particular distance between the camera and the object to be photographed.

The present invention is particularly well adapted for use in flash photography, although, as will be apparent to those skilled in the art, it may be otherwise used as well. In flash photography it is a common practice to mount a source of illumination, such as a flash bulb, in fixed relation to a camera, the flash bulb or other source of light being selected to give a desired and predetermined intensity of illumination at the camera. For a light source of any given candle power, the intensity of illumination on the object to be photographed varies inversely as the square of the object distance, that is, the distance between the lens of the camera and the object to be photographed. Hence in order to obtain a constant predetermined intensity of illumination on a film or other sensitized surface within the camera for different object distances, the quantity of light which passes through the lens must be regulated. Such regulation may be effected by varying the aperture of the diaphragm of well-known construction which is incorporated in most cameras.

The desired relationship between object distance and lens aperture may be represented by the following equation:

$$F = fD_o$$

wherein:

$D_o$ = the object distance.
$f$ = the ratio of the focal length of the lens to the diameter of the lens aperture, sometimes called the speed of the lens.
$F$ = the flash factor.

The flash factor $F$ is desirably maintained constant for a source of illumination of given candle power, but varies for light sources of different power, film of different sensitivity, and for various intervals of exposure.

It is an object of the present invention to provide apparatus whereby the lens aperture is automatically adjusted to a desired value as the lens of the camera is focused for a desired object distance. The problem of attaining this objective is complicated by the fact that the relationship between the focal position of the lens and the corresponding desired aperture is non-linear. The devices previously proposed for this purpose have in some cases been accurate for one or two values of the object distance but have been substantially in error at other points on the scale. With the device of the present invention, the desired relationship is maintained within relatively narrow limits over the entire range of values of object distance normally used in flash photography. Thus the device of the present invention is more accurate than those which have been previously proposed.

The many other objects and advantages of the present invention may best be appreciated by reference to the accompanying drawings which illustrate specific embodiments of the invention and wherein:

Figure 1 is a front elevation of the lens mount of a camera of the ring focusing type with apparatus constructed in accordance with the present invention mounted in operative relation thereto;

Figure 2 is a side elevation partly in section taken along the line 2—2 of Figure 1;

Figure 3 is a section taken on line 3—3 of Figure 1 and showing the construction which permits adjustment of the flash factor;

Figure 4 is a section at line 4—4 of Figure 1 showing the connection of the bell crank lever to one of the runners and its associated track;

Figure 5 is a perspective view of a bellows focusing camera showing the application of a device constructed in accordance with the present invention to a camera of this type; and Figure 6 is a top plan view of the bed plate of the camera of Figure 5.

Referring to the drawings, and particularly to Figure 1, there is shown a lens mount of the usual type comprising a focusing ring 1 which is rotatable to vary the distance between the sensitized surface and the lens of the camera. The focusing ring 1 carries an object distance scale 2 which cooperates with a stationary reference mark 3 to indicate the object distance for which the camera is focused.

The lens aperture is varied by rotating a lever 4 carrying a pointer 5 which cooperates with a stationary f scale 6 to effectively indicate the degree of opening of the lens aperture. The apparatus about to be described maintains the position of the focusing ring 1 in such relation to the position of the lever 4 that as the camera is focused by rotation of focusing ring 1, the product of the value on scale 2 opposite reference mark 3 and the value on scale 6 opposite pointer 5 is maintained substantially constant.

Still referring now to Figure 1, a bell crank lever 10 comprising the arms 11 and 12 arranged substantially at right angles with respect to one another is rotatably mounted on a fixed supporting plate 13 which is in turn fixed to the lens mount in any suitable manner, such as by means of the screws 14 and 15. The arm 11 of bell crank 10 is provided with a longitudinal slot 16 which slidably engages a roller 17 (see Figures 2 and 4), the roller 17 being rotatable about a pin 18 fixed to and extending upwardly from a runner 19. The runner 19 is slidably mounted in a track 20 formed by the V-shaped grooves 21 and 22 in the plate 13.

Referring to Figures 1 and 2, the runner 19 is connected at its right-hand end with the semi-rigid core 25 of an armored cable 26 connected at one end to the plate 13 and extending (see Figure 1) to a point adjacent the focusing ring 1 where it is mounted in a bracket 27 fixed to the lens mount. The end of the semi-rigid core 25 opposite to that which is connected to the runner 19 is attached in any suitable manner to a boss 28 on the focusing ring 1. The arrangement is such that linear movement of the runner 19 produces corresponding and proportional circumferential movement of the boss 28 and the focusing ring 1.

To move the runner 19 and, through core 25, the focusing ring 1, there is provided (see Figure 2) a screw 30 rotatably mounted in the bearings 31 and 32 and having at its left-hand end, as seen in Figure 2, a knurled knob 33 whereby the screw may be manually rotated. The screw 30 (see Figure 4) passes through a threaded bore 34 in a depending portion 35 of the runner 19 in such manner that rotation of the screw 30 causes linear movement of the runner 19 in the track 20 and at the same time, through roller 17, causes rotation of bell crank lever 10.

Referring again to Figure 1, the arm 12 of bell crank 10 is provided with a slot 38 which slidably engages a roller 39 mounted on a runner 40 in a manner similar to that in which roller 17 is mounted on runner 19. The runner 40 is slidably mounted in a track 41 which may be similar to the track 20. At its upper end the runner 40 is connected to the semi-rigid core 42 of a cable 43 connected at one end to the plate 13 and extending to a bracket 44 by means of which it is mounted on the lens mount. The end of the core 42 which extends from cable 43 near bracket 44 is connected in any suitable manner to the lever 4 in such a way that linear movement of the runner 40 in track 41 produces corresponding and proportional angular rotation of lever 4 and circumferential movement of pointer 5.

The operation of the device should be apparent from the above description. Focusing is accomplished by rotation of the knurled knob 33, the knob being rotated until the desired object distance is opposite the reference mark 3. In Figure 1, the camera is shown as adjusted for an object distance of five feet and a stop of f16. The product of these two values, that is the flash factor, is thus 80. If it is desired to focus the camera for an object distance of ten feet, the knurled knob 33 is turned clockwise to move runner 19 upward and, through core 25, to rotate the focusing ring to bring the numeral 10 of object scale 2 opposite reference mark 3. As runner 19 moves upward, bell crank 10 is rotated to move runner 40 upward and, through core 42, to rotate lever 4 clockwise until pointer 5 is opposite f8. In the illustration given, the movement of runner 40 will, of course, be appreciably less than the movement of runner 19. It is apparent that at the opposite end of the scale, that is, as runner 19 approaches the upper end of its track, a given movement of the runner 19 will produce a larger movement of the runner 40, thus maintaining a desired predetermined relationship between object distance and lens aperture.

Referring now to Figures 1 and 3, mechanism is shown for adjusting the relative positions of the runners 19 and 40 and their relative movement for different flash factors. Extending through a slot 47 in the plate 13 there is a bolt 48 carrying an indicating arm 49 and a pointer 50 which cooperates with a scale 51 to indicate the flash factor for which the device is adjusted. The position of bolt 48 determines the pivot point of bell crank lever 10.

The bell crank 10 is loosely mounted on a collar 52 which fits over the bolt 48, the bell crank being freely rotatable with respect to the collar. The bolt is held in place by a wing nut 53 which, when tightened up, bears against collar 52 and holds the pivot point of the bell crank 10 in fixed relation to the scale 51 but permits the bell crank to rotate freely. The device is adjusted by loosening the wing nut 53 and moving bolt 48 in slot 47 until pointer 50 indicates the desired value of flash factor on the scale 51.

In Figure 1 the relationship between the bell crank 10 and the tracks 20 and 41 is such that the axis around which the bell crank pivots, the point on the axis of track 20 corresponding with infinite object distance, and the point on the axis of track 41 corresponding with f infinity are all three in the same plane.

It is apparent that for each position of the focusing ring 1 there is a corresponding position of the element 19 and that as the element 19 moves upwardly, the infinity mark on object distance scale 2 approaches reference mark 3. With the construction shown in Figure 1, element 19 will reach the upper end of track 20 before the infinity mark on scale 2 reaches reference mark 3. The relationship between the parts is such that if track 20 were extended upwardly and the focusing ring rotated to bring the infinity mark opposite reference mark 3, then the center point of element 19 would be directly to the right of the axis of the bell-crank 10 as the bell-crank is shown in Figure 1.

Similarly, as element 40 moves downwardly in track 41 the aperture closes and pointer 5 approaches the f-stop corresponding with complete closure of the aperture (not indicated in Figure 1). If the element 40 were free to move downwardly beyond the bottom of track 41, the center point of the element would be directly to the right of the axis of bell-crank 10 when the aperture was completely closed, that is, at f infinity.

Thus the relationship between the parts is such that the axis of bell-crank 10, the point on the axis of track 41 corresponding with zero aperture and the point on the axis of track 20 corresponding with infinite object distance are all in the same plane.

Referring now to Figures 5 and 6 there is shown a second embodiment of the invention as applied to a camera of the bellows focusing type. In this type of camera focusing is accomplished by moving the lens mount 60 and its associated base plate 61 which carries pointer 62 cooperating with a footage scale 63 to indicate the object distance for which the camera is focused. A bell crank lever 64 is rotatably mounted upon a plate 65 which may be detachably mounted on a stationary part of the camera, such as, for example, the bed plate 66. The bell crank 64, like bell crank 10, is provided with two arms 67 and 68 arranged at substantially right angles with respect to each other. Arm 67 is provided with a slot 69 which slidably engages a pin 70 mounted on the base plate 61 in such manner that movement of the base plate and lens mount when focusing the camera moves pin 70 and thus rotates bell crank 64. Arm 68 is provided with a slot 72 which slidably engages a roller 73 similar to rollers 17 and 39, the roller being mounted on a runner 74 moving in a track 75 similar to tracks 20 and 41. Runner 74 is connected to a semi-rigid core 76 of an armored cable 77, one end of the cable 77 being connected to plate 65, and the other end of the cable being fixed to the lens mount as shown in Figure 5. The end of core 76 adjacent the lens mount is connected to aperture adjusting lever 78 in such manner that linear movement of runner 74 produces corresponding and proportional angular movement of aperture lever 78. The pivot point of bell crank 64 is adjustable in a manner similar to that in which the pivot of bell crank 10 is adjusted. When knurled knob 80 is loosened, the lever becomes slidable in slot 81 and may be moved to a position where indicating arm 82 indicates on scale 83 the desired flash factor. As in Figure 1, the product of the reading on the footage scale and the reading on the aperture scale will remain constant as the camera is focused for different object distances.

From the above description it may be seen that the present invention provides a simple and accurate device for maintaining a predetermined relationship between the lens aperture of a camera and the focal position of the lens. The device may be used for a relatively large range of flash factors and simplifies the problem of obtaining the proper lens aperture for various object distances.

Since various embodiments might be made of this invention, and since various changes might be made in the construction herein described, all without departing from the scope of the invention, it is to be understood that all matter herein set forth or shown in the accompanying drawings is to be interpreted as illustrative only and not in a limiting sense.

I claim:

1. In photographic apparatus of the type described, mechanism for maintaining the lens aperture in predetermined relation with the focal position of the lens, comprising, in combination, a first element linearly movable to positions which are in predetermined relation with the focal positions of said lens, mechanism operatively connecting said lens and said element, a second element linearly movable along a path parallel to the path of said first element to positions which are in predetermined relation with the aperture of said lens, mechanism operatively connecting said second element and said aperture, means rotatable about an axis for positioning said elements, said rotatable means being movably connected to said first element and said second element at points so located with respect to said axis that the lines connecting said points of connection and said axis form an angle of substantially 90° with respect to one another, and means for rotating said rotatable means to focus said lens.

2. In photographic apparatus of the type described, mechanism for maintaining the lens aperture in predetermined relation with the focal position of the lens, comprising, in combination, a first element linearly movable to positions which are in predetermined relation with the focal positions of said lens, mechanism operatively connecting said lens and said element, a second element linearly movable along a path parallel to the path of said first element to positions which are in predetermined relation with the aperture of said lens, mechanism operatively connecting said second element and said aperture, means rotatable about an axis for positioning said elements, said rotatable means being movably connected to said first element and said second element at points so located with respect to said axis that the lines connecting said points of connection and said axis form an angle of substantially 90° with respect to one another, means for rotating said rotatable means to focus said lens, and means for adjusting the position of said axis to adjust the relationship between said elements.

3. In photographic apparatus of the type described, mechanism for maintaining the lens aperture in predetermined relation with the focal position of the lens, comprising, in combination, a member rotatable about an axis, a first element movably connected to said member and linearly movable to positions which are in predetermined relation with the focal positions of said lens, mechanism operatively connecting said lens and said element, a second element movably connected to said member and linearly movable along a path parallel to the path of said first element to positions which are in predetermined relation with the aperture of said lens, mechanism operatively connecting said second element and said aperture, the points of connection of said first and second elements to said member being so located with respect to said axis that the lines connecting said points of connection and said axis form an angle of substantially 90° with respect to one another, and means for rotating said member whereby said lens may be focused while maintaining said aperture in predetermined relation with the focal position of said lens.

4. In photographic apparatus of the type described, mechanism for maintaining the lens aperture in predetermined relation with the focal position of the lens, comprising, in combination, a pivoted bell crank lever, a first element slidably connected to one arm of said bell crank and linearly movable to positions which are in predetermined relation with the focal positions of said lens, mechanism operatively connecting said lens and said element, a second element slidably connected to the other arm of said bell crank and linearly movable to positions which are in predetermined relation with the aperture of said lens, mechanism operatively connecting said second element and said aperture, and means for rotating said bell crank lever whereby the focus of said lens may be adjusted while maintaining said aperture in predetermined relation with the focal position of said lens.

5. In photographic apparatus of the type described, mechanism for maintaining the lens aperture in predetermined relation with the focal position of the lens comprising, in combination, a pivoted bell crank lever having arms arranged at substantially 90° with respect to one another, a first element slidably connected to one arm of said bell crank and linearly movable to positions which are in predetermined relation with the focal positions of said lens, mechanism operatively connecting said lens and said first element, a second element slidably connected to the other arm of said bell crank and linearly movable to positions which are in predetermined relation with the aperture of said lens, mechanism operatively connecting said element and said aperture, means for rotating said bell crank lever whereby the focus of said lens may be adjusted while maintaining said aperture in predetermined relation with said focus, and means for adjusting the pivot point of said bell crank to alter the relationship between said aperture and the focal position of said lens.

6. In photographic apparatus of the type described, mechanism for maintaining the lens aperture in predetermined relation with the lens focus comprising, in combination, a pivoted bell crank lever having arms arranged at substantially 90° with respect to one another, a first element movably connected to one arm of said bell crank and movable linearly and proportionally with said lens, mechanism operatively connecting said lens and said first element, a second element movably connected to the other arm of said bell crank and movable linearly and proportionally with movement of said aperture, mechanism operatively connecting said second element and said aperture, and means for rotating said bell crank lever whereby the focus of said lens may be adjusted while maintaining said aperture in predetermined relation with the focal position of said lens.

7. In photographic apparatus of the type described, mechanism for maintaining the lens aperture in predetermined relation with the focal position of the lens comprising, in combination, a pivoted bell crank lever having arms arranged at substantially 90° with respect to one another, a first armored cable with a flexible core, said core being slidably connected at one end with one arm of said bell crank and operatively connected at its other end with said lens, a second armored cable having a flexible core, said second core being slidably connected at one end with the other arm of said bell crank and operatively connected at its other end with said aperture, and means for rotating said bell crank lever whereby the focus of said lens may be adjusted while maintaining said aperture in predetermined relation with the focal position of said lens.

8. In photographic apparatus of the type described, mechanism for maintaining the lens aperture in predetermined relation with the focal position of the lens comprising, in combination, a pivoted bell crank lever having arms arranged at substantially 90° with respect to one another, a track, an element movable along said track and slidably connected to one arm of said bell crank, mechanism operatively connecting said element and said lens, a second track parallel with said first track, a second element movable along said second track and slidably connected to the other arm of said bell crank, mechanism operatively connecting said second element and said aperture, and means for rotating said bell crank lever whereby the focus of said lens may be adjusted while maintaining said aperture in predetermined relation with the focal position of said lens.

9. In photographic apparatus of the type described, mechanism for maintaining the lens aperture in predetermined relation with the focal position of said lens comprising, in combination, a pivoted bell crank lever having two slotted arms arranged at substantially 90° with respect to one another, a first element slidably connected in the slot of one of said slotted arms and linearly movable to positions which are in predetermined relation with the focal positions of said lens, mechanism operatively connecting said lens and said first element, a second element slidably connected in the slot of the other arm of said bell crank lever and linearly movable to positions which are in predetermined relation with the aperture of said lens, mechanism operatively connecting said second element and said aperture, and means for rotating said bell crank lever whereby the focus of said lens may be adjusted while maintaining said aperture in predetermined relation with the focal position of said lens.

10. In photographic apparatus of the type described, mechanism for maintaining the lens aperture in predetermined relation with the focal position of said lens comprising, in combination, a pivoted bell crank lever having arms arranged at substantially 90° with respect to one another, a first track, an element movable along said first track and slidably connected to one arm of said bell crank, mechanism for operatively connecting said element and said lens, a second track, a second element movable along said second track and slidably connected with the other arm of said bell crank, and mechanism operatively connecting said second element and said aperture, and said tracks being so arranged that the point on the axis of said first track corresponding with infinite object distance, the point on the axis of said second track corresponding with f infinity, and the axis of said bell crank lever are all in the same plane.

11. In photographic apparatus of the type described, mechanism for maintaining the lens aperture in predetermined relation with the focal position of the lens, comprising, in combination, a first element linearly movable to positions which are in predetermined relation with the focal positions of said lens, mechanism operatively connecting said lens and said element, a second element linearly movable along a path parallel to the path of said first element to positions which are in predetermined relation with the aperture of said lens, mechanism operatively connecting said second element and said aperture, means interconnecting said first and second elements to effect predetermined relative movement of said elements, and means for moving said first element to focus said lens.

JOHN B. DAVENPORT.